Sept. 23, 1930.   R. TULL ET AL   1,776,459
APPARATUS FOR MAKING STENCIL PRINTS
Filed March 5, 1928   6 Sheets-Sheet 3
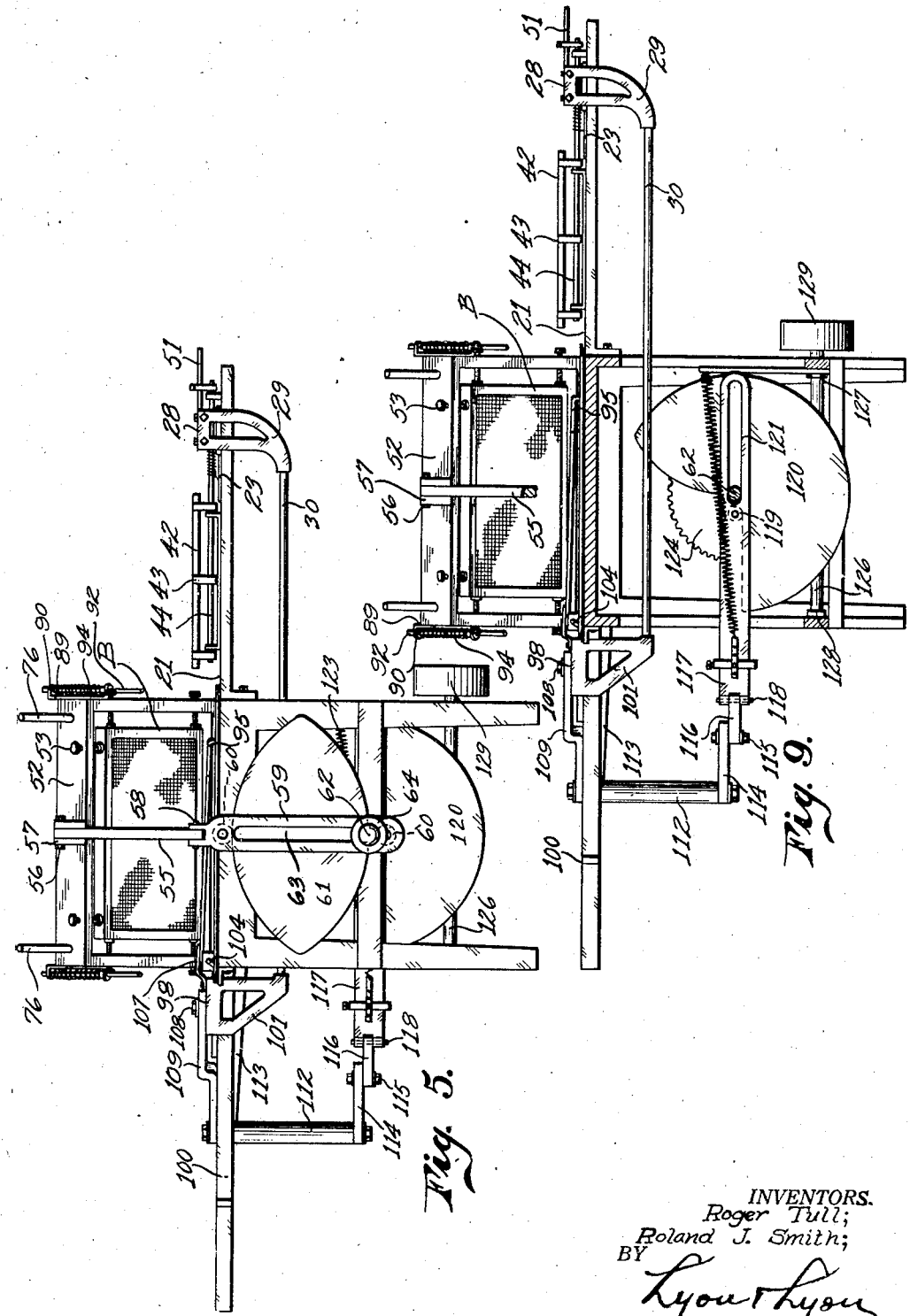
INVENTORS.
Roger Tull;
Roland J. Smith;
BY
Lyon & Lyon
Attys INVENTORS.
Roger Tull;
Roland J. Smith;
BY INVENTORS.
Roger Tull;
Roland J. Smith;
BY
Lyon+Lyon
Attys Sept. 23, 1930.  R. TULL ET AL  1,776,459
APPARATUS FOR MAKING STENCIL PRINTS
Filed March 5, 1928   6 Sheets-Sheet 6

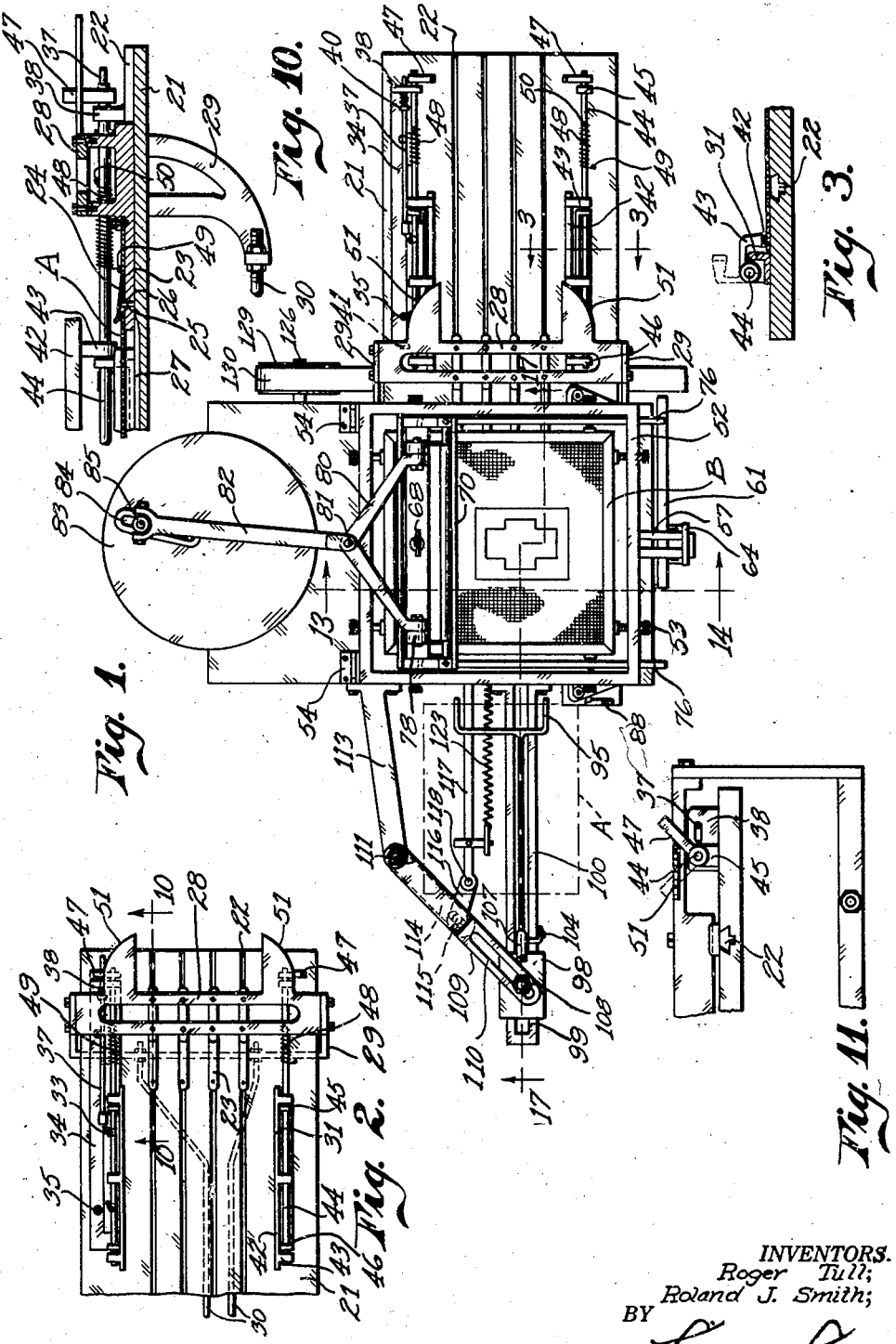

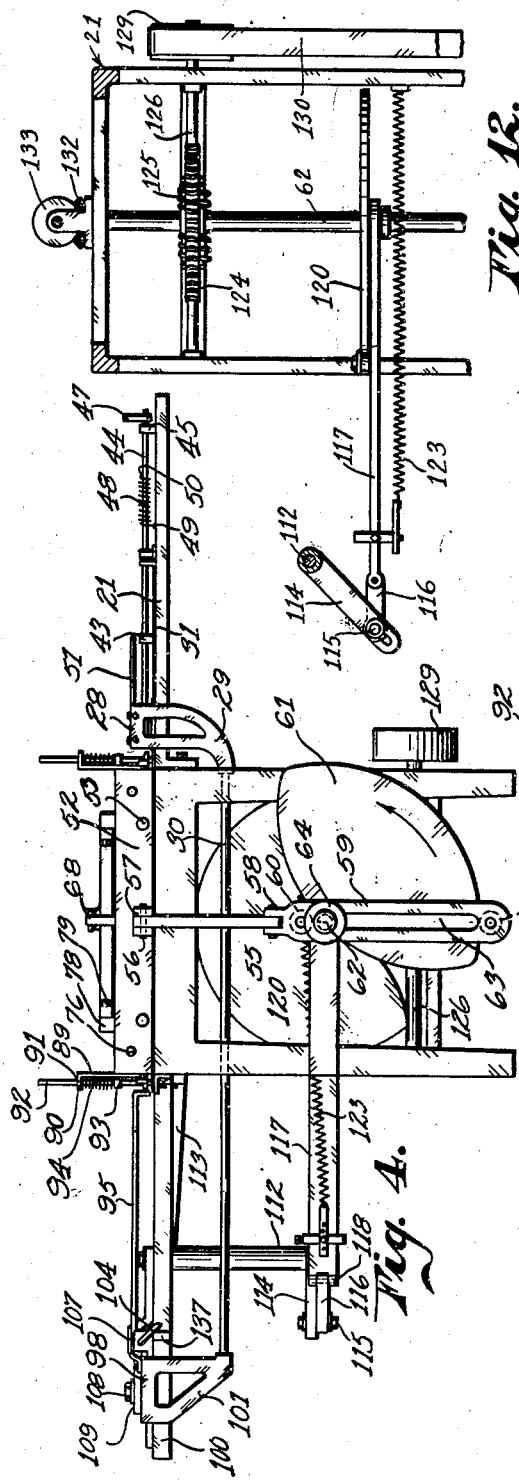

INVENTORS
Roger Tull;
Roland J. Smith;
BY
Lyon & Lyon
Attys

Patented Sept. 23, 1930

1,776,459

UNITED STATES PATENT OFFICE

ROGER TULL AND ROLAND J. SMITH, OF LOS ANGELES, CALIFORNIA, ASSIGNORS TO WESTERN LITHOGRAPH COMPANY, OF LOS ANGELES, CALIFORNIA, A CORPORATION OF CALIFORNIA

APPARATUS FOR MAKING STENCIL PRINTS

Application filed March 5, 1928. Serial No. 259,216.

This invention relates to apparatus for making stencil prints and is particularly useful, for example, in the making of stencil prints for forcing wet paints through screen stencils, a type of stencil which is made by blocking out portions of a design on bolting cloth held in a frame. This apparatus operates to feed the paper that is to receive the design into position beneath the raised stencil, operates to lower and raise the stencil, operates to press wet paint through the stencil while in lowered position upon the paper, operates to withdraw the paper from beneath the stencil when the stencil is raised and operates to hold and release the paper at the proper times in the cycle of operation.

One of the principal objects of the invention is to make possible the making of a greater number of stencil prints in a given period of time and with a given amount of labor than is possible by prior known apparatus. Since the class of work turned out by an apparatus of this description competes with color work produced by the lithographing process, it is important, in order to keep down the cost of production, that the prints from the stencils be made at a comparatively rapid rate. In the main, stencil prints are at present produced by hand pressing of wet paint through the stencil. This is quite laborious and, consequently, slow of execution, especially if the paint be in a relatively stiff condition. Such condition of the paint is preferable in order that it will stay exactly where impressed on the paper that receives it. If the paint were thin, it would run and, consequently, spoil the accuracy of the design.

Another important object of the invention is to provide a construction that will facilitate accurate registration of the various colors printed by the use of different stencils.

Another object is reliability of operation.

Another object is simplicity of construction.

Further objects and advantages will appear in the subjoined detailed description.

The accompanying drawings illustrate the invention.

Fig. 1 is a plan view of an apparatus constructed in accordance with the provisions of this invention.

Fig. 2 is a plan view of the right end portion of the apparatus shown in Fig. 1, the operating parts being shown in a different position.

Fig. 3 is an enlarged fragmental vertical section on the line indicated by 3—3, Fig. 1.

Fig. 4 is a front elevation of Fig. 1.

Fig. 5 is a view similar to Fig. 4 with the operating parts in different positions.

Fig. 8 is a vertical section on the irregular line indicated by 8—8 Fig. 6.

Fig. 9 is a sectional elevation on the irregular line indicated by 9—9 Fig. 7.

Fig. 10 is an enlarged fragmental vertical section on the line indicated by 10—10 Fig. 2.

Fig. 11 is an enlarged broken elevation of Fig. 2 from the right thereof.

Fig. 12 is an enlarged plan view, partly in section, from the line indicated by 12—12 Fig. 8.

Figure 6:
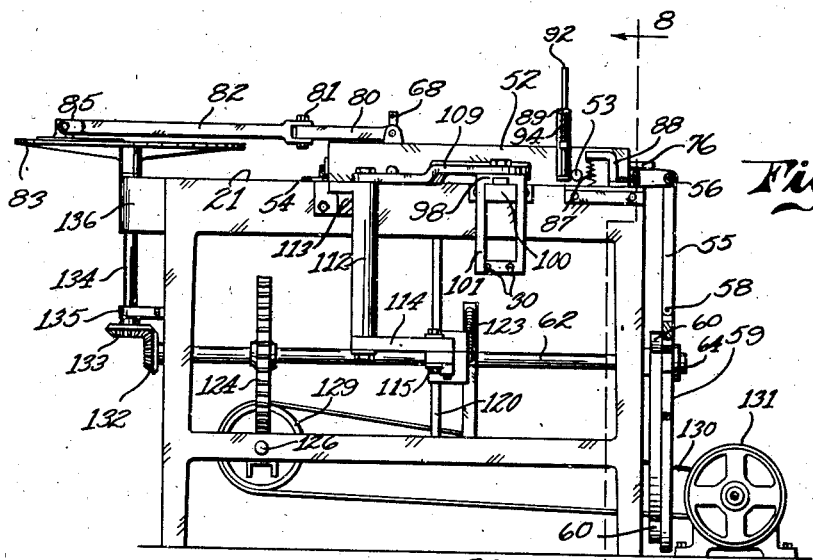
Fig. 6 is a end elevation of Fig. 4 looking toward the right, a portion being in section to show the followers that engage one of the cams.

Referring to the drawings there is provided a table 21 adapted to receive the paper or cardboard that is to be printed upon. In Fig. 1 the right end portion of the table 21 is the feed portion and the left end portion of the table is that upon which the paper rests when it receives the paint.

Paper translating mechanism is employed to slide the paper from the feed end of the table to the other end portion thereof and this mechanism is constructed as follows: the table 21 is provided in its upper face with longitudinally extending dovetailed slots 22 in which travel dovetailed paper engaging members 23, one of which is shown in section in Fig. 10. The paper, indicated at A, rests upon the upper face of the members 23 and, at the proper time, is clamped to said members by spring plates 24 secured to the upper face of the members 23. The members 24 are constructed to normally rest substantially flat upon the upper faces of the members 23 and a means is provided to at proper intervals raise the free end portions of the members 24 so as to permit of the marginal portion of the paper A passing between the members 24 and the upper face of the members 23. In this instance, to effect this, each of the members 24 is provided with a downwardly projecting stud 25 which passes through a hole 26 in the member 23. The studs 26 are sufficiently long so that when their lower ends rest upon the bottoms of the slots, the free ends of the members 24 will be held elevated as shown in Fig. 10. The studs 26 only ride upon the bottoms of the slots at the extreme outer end of the movement of the members 23 in the slots 22. During all but this portion of the travel of the members 23 in the slots 22, the lower ends of the studs 26 are accommodated in longitudinally extending grooves 27 in the table, said grooves opening into the slots 22. The outer ends of the grooves 27 slant upwardly to the slots of the table so as to form a cam surface upon which the studs 25 ride when passing from the grooves 27. In this instance the members 23 are integral with a cross-head 28 that extends from side to side of the table and that includes a U shaped member 29 that extends beneath the table. The member 29 connects with rods 30 which give motion to the cross-head longitudinally of the table.

Figure 7:
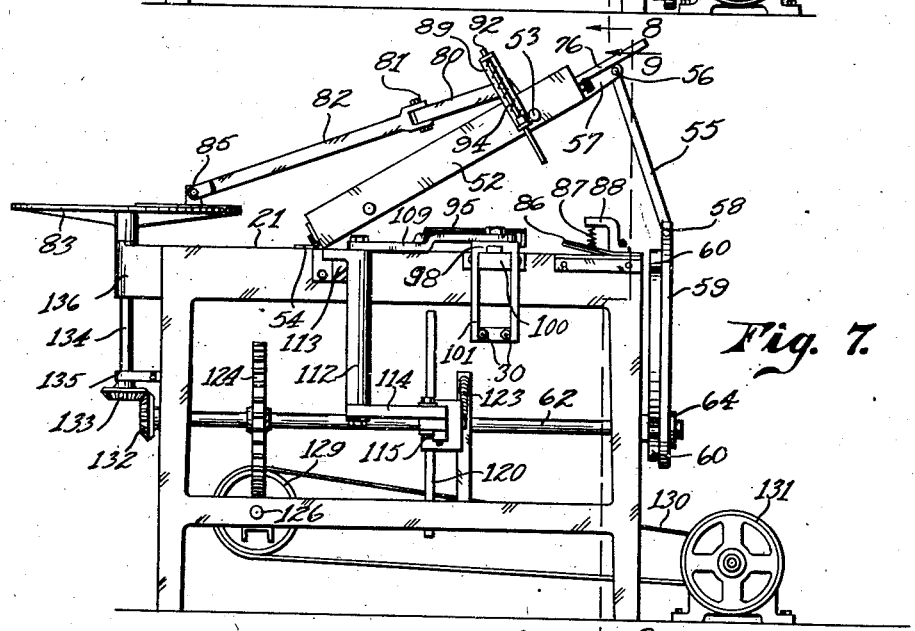
Fig. 7 is an elevation of Fig. 5 looking toward the right. This view is similar to Fig. 6 excepting that the operating parts are in different positions.
Figure 20:
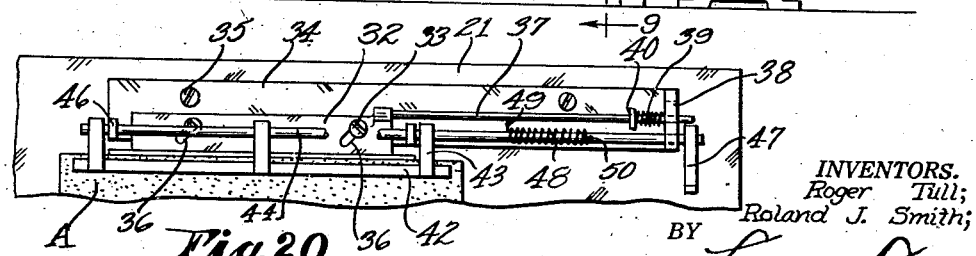
Fig. 20 is an enlarged fragmental plan view of the construction in the upper right hand portion of Fig. 10, mainly showing the movable guide, its mounting, and one of the members for preventing upward curling of the sheet of paper together with the mounting for said member.

The paper A will be placed on the table 21 with one of its longitudinal margins resting against a stationary guide 31 that is secured longitudinally of the table on the upper face thereof. A movable guide 32 is provided to engage the opposite margin of the paper A and this construction is best shown in Fig. 7.

The movable guide 32 extends longitudinally of the table and is shiftably connected by cap screws 33 to a bracket 34 which is secured by screws 35 to the upper face of the table. The screws 33 pass through slots 36 in the guide 32, said slots being positioned at an angle to the longitudinal axis of the guide 32 so that longitudinal movement of the guide 32 will also produce lateral motion of said guide. Motion is transmitted to the guide 32 by a rod 37 which has one end connected to the guide 32 and its other end slidably engaging a bearing 38 formed on the bracket 34. In Fig. 7 the rod 37 is normally held to the left by a coil spring 39 which surrounds the rod 37 between the bearing 38 and a shoulder 40 on rod 37. When the rod 37 is thus held by the spring, the guide 32 is in its inner position against the margin of the paper. The guide 32 will be actuated outwardly and held momentarily in that position by reason of a lug 41 on the cross-head 28 engaging the shoulder 40 when the cross-head nears its extreme right hand position in Fig. 1. The lug 41 is indicated in Fig. 1.

When relatively thin paper is employed, and, especially certain kinds of paper, the edges of said paper tend to curl upwardly. This is often due to the sizing on the paper and, because of this tendency to curl, there are provided means to hold the longitudinal margins of the paper against the upper face of the table, one of said means being positioned along each side of the table and, since they are alike, it will only be necessary to describe one of them. Referring more particularly to Figs. 1, 2, 3 and 11 of the drawings, each of the means for holding the longitudinal margins of the paper against the table comprises a longitudinally extending member 42 provided near its opposite ends with L shaped arms 43 which are fixed to a rod 44 that turns in bearings 45, 46 that are supported on the upper face of the table. The outer end of the rod 44 is provided with a finger 47. Since there are two of the mechanism just described, there are two fingers 47 and these fingers are normally caused to project aslant inwardly and upwardly by coil springs 48 that surround the rods 44, one end of each spring being secured at 49 to the table and the other end at 50 to the rod. The expansive force of the springs 48 are exerted in a direction to hold the fingers 47 in the paths of travel of cam faces 51 formed on the cross-head 28, said cam faces, in this instance, extending inwardly toward the right end of the table in Fig. 1. When the cross-head 28 approaches its extreme outer position, the cam faces 51 engage the fingers 47 and rotate said fingers outwardly, thus effecting the swinging of the members 42 upwardly and outwardly away from the face of the table. This enables the sheet of paper to be placed in position on the table so that as the cross-head moves on its in-stroke, thus disengaging the fingers 47, the members 42 will be caused by the springs 48 to descend and hold the longitudinal margins of the paper in close contact with the upper face of the table.

When the various devices hereinbefore described have cooperated to move the paper A to a position on the left hand portion of the table 21, printing of the paper is here effected and for this purpose a stencil is removably mounted in position over this portion of the table. The stencil is indicated at B and does not constitute a portion of the invention as it may be of any wellknown construction and is replaceable by another or other stencils as is customary in making prints. The stencil B is detachably held in a frame 52 by a number of set screws 53 which extend inwardly through the frame and have their inner ends bearing against the edges of the stencil B. The frame 52 is rectangular and, in this instance, two of the set screws 53 are provided on each side of the frame making, in all, eight set screws.

The frame 52 is hinged at 54 to the table 21 so that said frame can be swung up and down, the hinges 54 being positioned so that the movement of the frame B is transversely of the movement of the cross-head 28. The vertical swinging of the frame B may be produced by any suitable mechanism and, in this instance, said mechanism comprises a connecting rod 55 pivoted at 56 to an arm 57 that projects from the middle portion of that side of the frame that is opposite to the hinged side. The connecting rod 55 is pivoted at 58 to a slotted reciprocating member 59 that carries spaced followers 60 which, in this instance, are in the form of rollers and which engage the peripheral face of a cam 61 fixed to a shaft 62. The shaft 62 projects through the slot 63 in the member 59 so as to guide said member 59 and said shaft is provided with a shoulder 64 between which shoulder and one face of the cam 61 the member 59 moves, the lateral motion of the slotted member being thus limited by the cam 61 and the shoulder 64.

To force wet paint through the open portions of the stencil there is provided a squeegee 65 of rubber or other suitable material. This squeegee is adjustably mounted in a carrier 66, being in this instance shiftably mounted in a slot 67 extending lengthwise of the carrier 66. The carrier 66 extends in the same direction as the path of motion of the cross-head 28. An adjusting screw 68 is screwed into the carrier 66 and projects into the slot 67 and bears against the upper edge of the squeegee 65 so as to limit upward movement of the squeegee relative to the carrier 66. The carrier 66 is pivotally supported by pivots 69 in a paint reservoir 70 in which the wet paint, indicated at C is placed. Swinging of the carrier 66 is limited in opposite directions by stops 71 projecting from the ends of the carrier 66 into curved slots 72 in the paint reservoir 70, the ends of the slots engaging and limiting movement of the stops 71. The paint reservoir 70 is provided in its lower portion with an opening 73 through which the squeegee 65 projects when said squeegee is in the stencil engaging position shown in Fig. 13. The bottom of the paint reservoir 70 is preferably curved as shown at 74, said curvature conforming approximately to an arc struck from the axes of the pivots 69. The squeegee 65 functions not only to press paint through the stencil but also as a gate to close against the bottom 74 of the paint reservoir when said reservoir is in the tilted position shown in Fig. 14 so at that time to prevent paint flowing out of the paint reservoir through the opening 73 and onto the stencil. The carrier 66 is provided with a second gate 75 of rubber or the like which is in such relation to the pivots 69 and reservoir bottom 74 as to be spaced substantially a uniform distance from the bottom 74 whether the carrier 66 is in the position shown in Fig. 13 or in Fig. 14. The gate 75 controls the amount of paint that can pass downwardly to the lower portion of the bottom 74 and also functions, when the carrier 66 swings from the position shown in Fig. 14 to that shown in Fig. 13, to positively feed the paint lying in front of it through the opening 73 and onto the stencil. Thus, by this mechanism, a definite amount of paint can be deposited on the stencil each time the carrier 66 swings to the left in Fig. 14.

Figure 13:
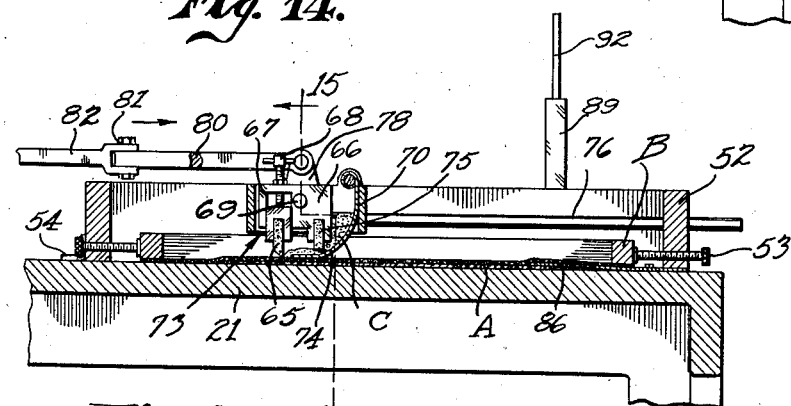
Fig. 13 is an enlarged fragmental vertical section on the line indicated by 13—14 Fig. 1.
Figure 15:
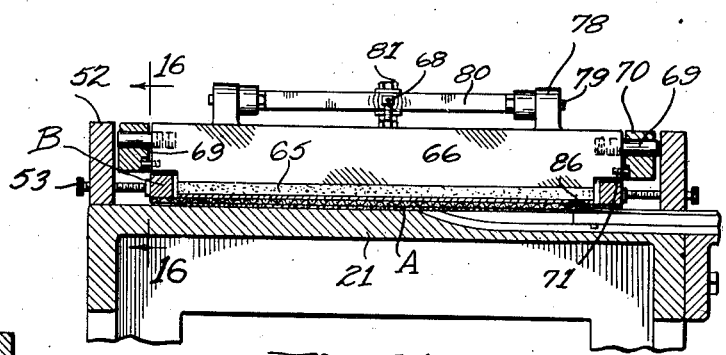
Fig. 15 is a vertical section on the irregular line indicated by 15—15 Fig. 13.
Figure 16:
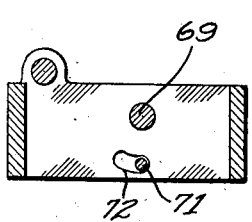
Fig. 16 is a sectional detail on the line indicated by 16—16 Fig. 15.

The paint reservoir is shiftably mounted in the frame 52 and for that purpose is provided with guide rods 76 that project through guide orifices 77 in the frame 52. To reciprocate the paint reservoir and tilt the carrier 66, said carrier is provided with upstanding ears 78 to which are pivoted at 79 a fork 80 which in turn is pivoted at 81 to a connecting rod 82 that receives a reciprocating motion from a rotary member 83 which, in effect, constitutes a crank. In this instance the member 83 is in the form of a disc provided with a slot 84 through which projects a pivot 85 carried by the rod 82. The pivot 85 is adjustable to different positions along the slot 84 so as to govern the length of stroke of the rod 82 and, consequently, of the paint reservoir. In Fig. 13 it may be assumed that the rod 82 is moving in the direction of the arrow and, consequently, the thrust upon the carrier 66 causes said carrier to assume the position wherein the squeegee 65 is spaced from the reservoir bottom 74 and presses upon the stencil. This action occurs, of course, during the entire stroke of the paint reservoir from the left to the right in Fig. 13. After the paint reservoir reaches the end of its stroke to the right, the rod 82 will be pulled in the direction of the arrow in Fig. 14, thus first tilting the carrier 66 to the position shown in Fig. 14 and then moving said carrier together with the paint reservoir from right to left.

Preferably the frame 52 carries a pair of devices cooperating with a member on the table to clamp one margin of the paper A to the table during the time that the frame 52 is swinging downwardly and bringing the stencil in contact with the paper so as to insure against moving of the paper A beneath the stencil while the paint is being applied to the paper. These devices and the member that cooperates therewith have another function that is probably of still greater importance and that is to strip the paper from the stencil when the stencil swings upwardly. This stripping mechanism, as it may be termed, is constructed as follows: Secured to the upper face of the table is a strip 86 which, if desired, may be made of spring metal and constructed so that its free edge will naturally tend to spring away from the table. Whether or not the strip 86 is constructed of spring metal, a tension spring 87 may be employed to yieldingly hold the strip 86 in the raised position shown in Fig. 7, one end of said spring being secured to the spring 86 and the other end to a bracket 88 secured to the table.

Means yieldingly mounted on the frame 52 are adapted to engage the strip 86 on the downward swinging of the frame 52 to force the strip 86 downwardly upon the marginal portion of the paper A. These yieldingly mounted means, in this instance, are provided in duplicate on opposite sides of the frame 52 and, since they are alike, only one of them need be described in detail, the construction being as follows: The frame is provided with an upwardly projecting L shaped arm 89, one leg 90 having a guide orifice 91 to slidably receive a rod 92. The rod 92 is provided with a shoulder 93 and between the shoulder 93 and the leg 90 is a coil spring 94, the pressure of which yieldingly holds the rod 92 downwardly. The arm 89 is properly positioned on the frame and the rod 92 is made of sufficient length so that when the frame 52 reaches approximately the position shown in Fig. 14, the lower end of said rod will engage the strip 86. Also the relation of the shoulder 93 and spring 94 are such that the rod 92 will not interfere with the lowering of the frame 52 sufficiently to bring the stencil in contact with the paper A.

After the printing of the paper is effected, it is removed from beneath the raised stencil by suitable paper withdrawing mechanism which, in this instance, is constructed as follows: There is provided a shifting fork 95 provided with downwardly bent ends 96. The shifting fork 95 is pivoted at 97 to a reciprocating head 98 that slidably engages in a groove 99 of a bracket 100 that projects horizontally from the table. The upper face of the bracket 100 is substantially flush with the upper face of the table and, thus, in reality forms an extension of said table for the paper to slide on when it is withdrawn from beneath the stencil. The head 98 is provided with downward extending arms 101 which straddle the bracket 100 and to which are connected the rods 30, thus insuring that the head 98 and cross-head 28 reciprocate in unison when the head 98 is actuated.

Figure 17:
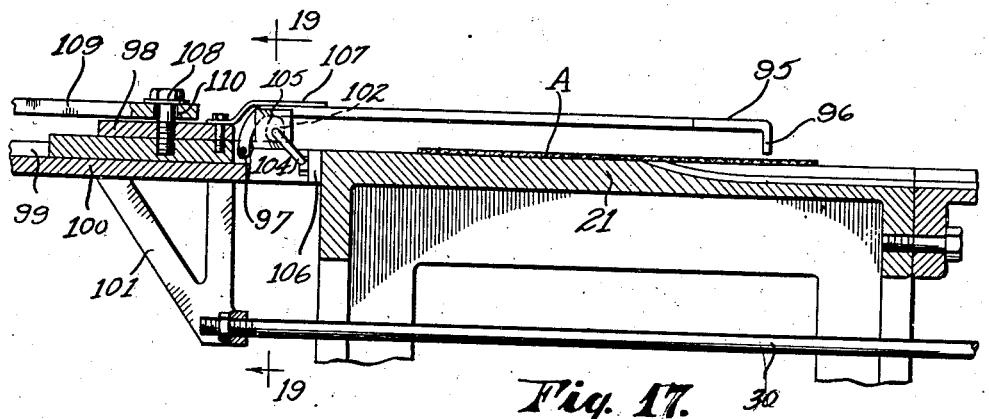
Fig. 17 is an enlarged fragmental vertical section on the irregular line indicated by 17—17 Fig. 1, with the work discharging mechanism in a different position.
Figure 18:
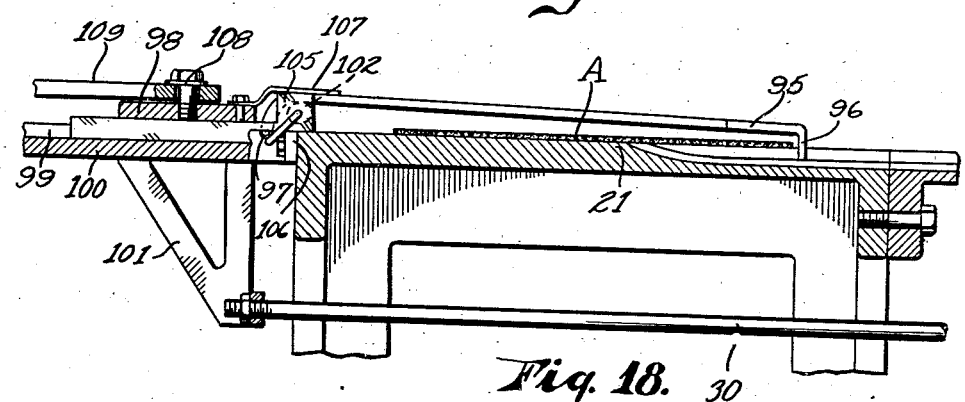
Fig. 18 is a sectional view similar to Fig. 17 excepting that the work discharging mechanism is in a still different position.
Figure 19:
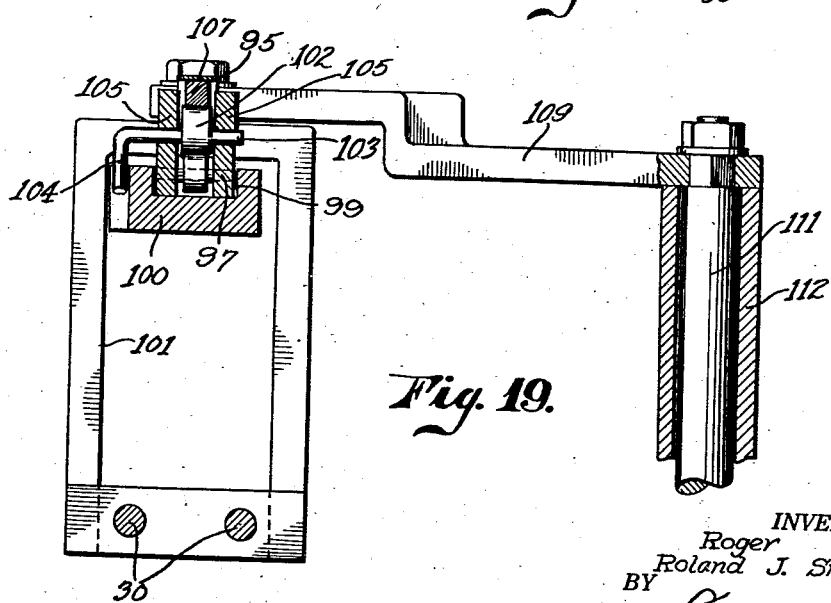
Fig. 19 is an enlarged fragmental vertical section on the line indicated by 19—19 Fig. 17.

Gravity tends to cause the fork 95 to assume the position shown in Fig. 18 so as to rake the paper from beneath the stencil. Accordingly, it is necessary to provide a means to raise the fork 95 and hold the same in raised position while the fork is moving on its in-stroke, the raising of the fork being effected at the outer end of the out-stroke of said fork. This means, in this instance, comprises an eccentric or cam 102 fixed to a rock shaft 103 provided with an arm 104. The rock shaft 103 is mounted to turn in bearings 105 that constitute portions of the head 98. The eccentric 102 is vertically alined with the fork 95 so that, when the eccentric 102 is in the position shown in Fig. 17, the fork 95 rests upon said eccentric and is in the raised position with the fork ends 96 raised above the level of the paper. The relation of the eccentric 102 and arm 104 is such that, when said eccentric holds the fork 95 in the raised position, said arm extends downwardly to the right, as in Fig. 17, thus enabling said arm 104 to engage a stop 106 when the head 98 is moved almost to its extreme righthand position. As said head moves further to the limit of its righthand stroke, the arm 104 is caused to swing from the position shown in Fig. 17 to that shown in Fig. 18, thus rotating the eccentric 102 out of fork holding position, and accordingly said fork drops to the position shown in Fig. 18, in which position the fork ends 96 extend below the level of the paper A. The stop 106, in this instance, is formed by a portion of the bracket 100. Instead of relying solely upon gravity to swing the fork 95 downwardly, a spring 107 may be employed to aid the force of gravity. The spring 107 presses upon the upper face of the fork 95 and is suitably secured to the head 98.

To reciprocate the head 98 there is pivoted at 108 to said head a lever arm 109, the pivot 108 preferably passing through a slot 110 in said arm 109 and the pivot 108 being, in this instance, in the form of a cap screw or stud so as to permit of adjustment of the arm 109 relative to the head 98. This adjustment regulates the travel of the head 98 and this in turn controls the stroke of the said mechanism through which proper registration of the paper with the stencil is effected. This is very important when printing in several colors so as to print each succeeding color in the exact place desired on the paper.

The lever arm 109 is fixed to one end of the pivot 111 which turns in a bearing 112 supported by a bracket 113 that projects from the table 21. To the other end of the pivot 111 is fixed a lever 114 which, in turn is pivoted at 115 to a sectional connecting rod comprising sections 116, 117 connected by a pivot 118. The rod 117 is provided with a follower 119, in this instance in the form of a roller, which engages the periphery of a cam 120 that is fixed to the shaft 62. The rod 117 has a guide slot 121 through which the shaft 162 projects and by which shaft said rod is guided in its endwise motion. Lateral motion of the rod 117 is prevented by the cam 120 and a shoulder 122 on the shaft 62 as said rod 117 slides between said cam and shoulder. The cam 120 turns in the direction of the arrow thereon in Fig. 8 so as to move the rod 117 to the left and movement to the right of the rod 117 is effected by a coil spring 123 which is secured at one end to the rod 117 and at its opposite end to the table. Thus the cam 120 operates to move the feed members 23 and fork 95 to the left in Fig. 1 to feed and withdraw the paper, and the spring 123 operates to retract the same.

The rest of the driving mechanism for connecting up the portions of the driving mechanism, above described, is as follows: Fixed to the cam shaft 62 is a worm gear 124 in mesh with a worm 125 on a shaft 126 which turns in bearings 127, 128 supported by the table. The shaft 126 is driven by a pulley 129 which is connected by a belt 130 to a motor 131, said motor not constituting a portion of the present invention. At one end the shaft 62 is provided with a miter gear 132 in mesh with a miter gear 133 on the lower end of a shaft 134 which turns in bearings 135, 136 secured to the table. On the upper end of the shaft 134 is mounted the hereinbefore described disc 83 whose rotation effects reciprocation of the paint reservoir and parts connected therewith.

The invention operates as follows: Assuming that the operating parts are in the positions indicated in Figs. 2, 5, 7 and 9 of the drawings and that the motor 131 is operating, the printer places a sheet of paper on the table 21 in front of the members 23 or, in other words, to the left thereof in Fig. 2 and the printer slides the paper A beneath the upraised edges of the spring members 24 as shown in Fig. 10. It is to be understood that the term paper employed in this specification defines any material suitable for receiving paint from a stencil and at the same time of sufficient stiffness to be used in the apparatus. When the cross-head 28 is in this position, it is to be noted that the shoulder 40 is held by the lug 41 in position to cause the movable guide 32 to be in the retracted position. Also the cam faces 51 will be in position to hold the fingers 47 outwardly, thus holding the members 42 in their upper positions. At this time the stencil B is in raised position. The cross-head 28 moves to the left from the position shown in Fig 2 to the position shown in Fig. 1. Since the studs 25 enter the grooves 27, the spring members 24 will firmly clamp the paper A, but prior to this, the lug 41 leaves the shoulder 40, thus permitting the spring 48 to push the guide 32 inwardly against the adjacent longitudinal edge of the paper which forces the paper laterally against the stationary guide 31, as in Fig. 3, if it is not already resting thereagainst. Also prior to the clamping action just mentioned, the cam faces 51 leave the fingers 47, whereupon the springs 48 immediately function to cause the members 42 to be swung inwardly and downwardly so as to rest upon the longitudinal margins of the paper, as indicated in Fig. 3.

Figure 14:
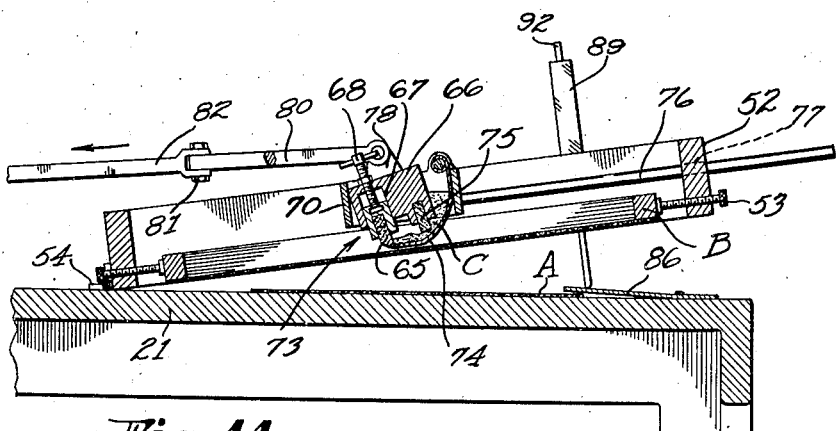
Fig. 14 is an enlarged fragmental vertical section on the line indicated by 13—14 Fig. 1, the operating parts being in different positions.

The cross-head 28 having reached the position indicated in Fig. 1, thus thrusting the paper beneath the upraised stencil, the relative timing of the cross-head movement and downward swinging of the frame 52 is such that said downward swinging then ensues. After the frame 52 has descended part way, it and the parts closely associated therewith are positioned as indicated in Fig. 14, thus engaging the rods 92 with the strip 86. Further downward swinging of the frame 52 causes the rods 92 to compress the strip 86 upon one margin of the paper A and the frame 52 continues to descend until the stencil contacts with the upper surface of the paper A. At this moment the paint reservoir will be in its extreme retracted position, as indicated in Fig. 1. Rotation of the disc 83 now causes the paint reservoir to move toward the right, as in Fig. 13, thus distributing wet paint from the paint reservoir onto the upper face of the stencil and at the same time causing the squeegee 65 to traverse the upper section of the stencil so as to evenly distribute the wet paint and at the same time force the paint through the open pores of the stencil onto the upper surface of the paper therebeneath. Rotation of the disc 83 from the position shown in Fig. 1 through 180° will push the paint reservoir to the extreme righthand end of the frame in Fig. 13, thus completing the forcing of the paint through the stencil. As the disc 83 continues to turn, it retracts the paint reservoir and at the beginning of this retraction the cam 61 is in position to begin the upward swinging of the frame 52 that holds the stencil, thus lifting the stencil off of the printed paper. As the stencil starts to rise, the strip 86 serves to strip the paper from the stencil so that the printed paper will remain on the upper face of the table.

Near the beginning of the upward swinging of the stencil, the cam 120, being in the position indicated in Fig. 8, will operate to move the rod 123 to the right, thus shifting the cross-head 28 and the fork 95 to the right. At the end of this movement the cross-head 28 will be at the beginning of the cycle of operations described above. As the fork 95 moves to the right, it comes to the position indicated in Fig. 17, thus bringing the arm 104 in contact with the stop 106. Further movement of the fork to the right causes the arm 104 to swing into the position indicated in Fig. 18, thus permitting the fork to lower into the position indicated in Fig. 18, in which position the fork extends below the level of the paper. In this position of the fork, the ends 96 extend below the upper face of the table, being accommodated in two of the slots 22.

The printer now places another sheet of paper in the same position as he placed the first one and the cycle of operations described above will be repeated and, as the cross-head 28 feeds the second sheet of paper into printing position beneath the stencil the head 98 simultaneously moves to the left in Fig. 18, thus drawing the fork 95 from beneath the stencil. In this movement the fork 95 engages one edge of the first paper so as to slide the same along the upper face of the table onto the table extension 100. When the head 98 reaches the position shown in Figs. 4 and 8, the arm 104 strikes an abutment 137 on one side of the bracket 100, thus swinging the arm 104 to the right so as to turn the cam 102 to the position shown in Fig. 17 in order to raise the fork 95 to the position indicated in Fig. 17. In this position of the fork 95 it is ready for the subsequent movement to the right to withdraw the second sheet after the second sheet is printed.

We claim:

1. An apparatus of the character described comprising a table, a means operable to raise and lower a stencil over a portion of the table, a means operable to feed a piece of paper to position beneath the stencil while the stencil is raised, a squeegee mounted to press upon the stencil, a means to operate the squeegee while the stencil is lowered, and a means operable to withdraw the piece of paper from beneath the stencil while the stencil is raised.

2. An apparatus of the character described comprising a table, a means operable to raise and lower a stencil over a portion of the table, a squeegee mounted to press upon the stencil, a means to supply wet paint in measured quantities to the stencil, and a means to operate the squeegee while the stencil is lowered.

3. An apparatus of the character described comprising a table, a means operable to raise and lower a stencil over a portion of the table, a squeegee, a means operable upon raising of the stencil to raise the squeegee and rock said squeegee in one direction and operable when the stencil is in its lowered position to lower the squeegee onto the stencil and rock said squeegee in the opposite direction in contact with the stencil, and a means cooperating with the squeegee when said squeegee is rocked the last-mentioned time to feed paint in front of the squeegee.

4. An apparatus of the character described comprising a table, a means operable to raise and lower a stencil over a portion of the table, a squeegee mounted to rock into and out of engagement with the stencil, a means to rock and reciprocate the squeegee, and a means cooperating with the squeegee when said squeegee is rocked to one position to feed paint in front of the squeegee.

5. An apparatus of the character described comprising a table, a means operable to raise and lower a stencil over a portion of the table, a paint reservoir mounted to reciprocate along the table and provided with a paint discharge opening, a squeegee operable to one position to close the opening and operable to a second position away from said opening, said squeegee in the first position being free from contact with the stencil and in the second position being in contact with the stencil.

6. An apparatus of the character described comprising a table, a means operable to raise and lower a stencil over a portion of the table, a paint reservoir mounted to reciprocate along the first mentioned means and provided with a paint discharge opening, a squeegee movably mounted in the paint reservoir, and a means to move the squeegee into position to close the discharge opening and into another position away from said discharge opening.

7. An apparatus of the character described comprising a table, a means operable to raise and lower a stencil over a portion of the table, a paint reservoir mounted to reciprocate along the first mentioned means and provided with a paint discharge opening, a squeegee pivotally mounted in the paint reservoir and adapted to be swung into a position to close the discharge opening and into a second position away from said discharge opening, a rod pivotally connected to the squeegee, and a means to reciprocate said rod.

8. An apparatus of the character described comprising a table, a frame, a means operable to raise and lower the frame over a portion of the table, a paint reservoir mounted to reciprocate in the frame and provided with a paint discharge opening, a squeegee pivotally mounted in the paint reservoir and adapted to be swung into a position to close the discharge opening and into a second position away from said discharge opening, and a means connected with the squeegee to swing said squeegee on its pivots and through said pivots to reciprocate the reservoir.

9. An apparatus of the character described comprising a table, a stencil holding means, a means to raise and lower the stencil holding means over a portion of the table, a means operable to press wet paint through the stencil, a paper-feed member mounted to reciprocate horizontally to and from said table portion and to raise and lower, means to reciprocate said paper-feed member, and means operated by horizontal motion of the paper-feed member to raise and lower said member.

10. An apparatus of the character described comprising a table, a stencil holding means, a means to raise and lower the stencil holding means over a portion of the table, a means operable to press wet paint through the stencil, a member mounted for reciprocation above the table, a means to reciprocate said member, a paper-feed member pivoted to the reciprocating member and provided with a downwardly projecting end to engage the edge of a piece of paper, a cam mounted on the head in position to engage the under face of the paper-feed member, an arm to turn the cam, and abutments on the table positioned to engage the arm to throw it in opposite directions.

11. An apparatus of the character described comprising a table, a stencil holding means, a means to raise and lower the stencil holding means over a portion of the table, a means operable to press wet paint through the stencil, a spring strip secured to said table portion and having a marginal portion normally bent upwardly from the surface of the table, and a yieldingly mounted means on the stencil holding means engageable with the spring strip by downward movement of the stencil holding means to press said strip toward the table.

12. An apparatus of the character described comprising a table, a stencil holding means, a means to raise and lower a stencil holding means over a portion of the table, a means operable to press wet paint through the stencil upon a piece of paper placed therebeneath, and a means operating when the stencil holding means is rising to strip the piece of paper from the under face of the stencil.

13. An apparatus of the character described comprising a table, a stencil holding means, a means to raise and lower the stencil holding means over a portion of the table, a means operable to press wet paint through the stencil, a spring strip secured to said table portion and having a marginal portion normally bent upwardly from the surface of the table, a means to feed a piece of paper onto said table portion with a marginal portion of said paper positioned beneath said marginal portion of the spring strip, and a yieldingly mounted means on the stencil holding means engageable with the spring strip by downward movement of the stencil holding means to press said strip upon said paper.

14. An apparatus of the character described comprising a table, a stencil holding means, a means to raise and lower the stencil holding means over a portion of the table, a means to press wet paint through the stencil, a means operable by rising of the stencil holding means to strip a piece of paper from the under face of the stencil as the stencil holding means rises, and a means to feed a piece of paper into position to be engaged by the stripping means while the stencil is in raised position.

15. An apparatus of the character described comprising a table, a stencil holding means, a means to raise and lower the stencil holding means over a portion of the table, a means to press wet paint through the stencil, a horizontally shiftable member mounted on the table engageable with one edge of a sheet of paper on the table, a means to shift said member to and from said table portion, and means on the table operating to press upon opposite marginal portions of the paper as the shiftable member operates toward said table portion.

16. An apparatus of the character described comprising a table, a stencil holding means, a means to raise and lower the stencil holding means over a portion of the table, a means to press wet paint through the stencil, a reciprocating means operable on its in-stroke to slide a sheet of paper on the table into position beneath the stencil holding means, members mounted on the table to one side of said portion in position to overlie opposite marginal portions of said sheet, means yieldingly pressing said members toward said sheet, and means operable to raise said members when the fourth mentioned means is approaching the end of its out-stroke.

17. An apparatus of the character described comprising a table, a stencil holding means, a means to raise and lower the stencil holding means over a portion of the table, a means to press wet paint through the stencil, a reciprocating means operable on its in-stroke to slide a sheet of paper on the table into position beneath the stencil holding means, members mounted on the table to one side of said portion in position to overlie opposite marginal portions of said sheet, means yieldingly pressing said members toward said sheet, and means operable by the fourth mentioned means on its out-stroke to raise said members.

18. An apparatus of the character described comprising a table, a stencil holding means, a means to raise and lower the stencil holding means over a portion of the table, a means to press wet paint through the stencil, a reciprocating means operable on its instroke to slide a sheet of paper on the table into position beneath the stencil holding means, members movably mounted on the table to one side of said portion in position to overlie opposite marginal portions of said sheet, means yieldingly pressing said members toward said sheet, and means including arms connected with said members and cams on the fourth mentioned means to raise said members, said cams engaging the arms on the out-stroke of said fourth mentioned means.

19. An apparatus of the character described comprising a table, a stencil holding means, a means to raise and lower the stencil holding means over a portion of the table, a means to press wet paint through the stencil, a reciprocating means operable on its instroke to slide a sheet of paper on the table into position beneath the stencil holding means, a stationary guide on the table to one side of said table portion, a guide movably mounted on the table opposite to the stationary guide, a means yieldingly holding the movable guide toward the stationary guide, and a means operated by the fourth mentioned means on its outstroke to move the movable guide away from the stationary guide.

20. An apparatus of the character described comprising a table, a stencil holding means, a means to raise and lower the stencil holding means over a portion of the table, a means to press wet paint through the stencil, a member mounted to reciprocate on the table to and from said portion, a means on said member operating to clamp a sheet of paper to said member, and a means connected with the last mentioned means operating when said member reaches a predetermined position to move the clamping means out of clamping position.

21. An apparatus of the character described comprising a table provided with a groove ending in an upwardly slanting cam surface, a stencil holding means, a means to raise and lower the stencil holding means over a portion of the table, a means to press wet paint through the stencil, a member mounted to reciprocate on the table along the groove to and from said portion, a spring plate secured on the upper face of the reciprocating member, and a stud secured to the spring plate and projecting through the reciprocating member and engaging in the groove when said stud is in register with said groove, said stud adapted to ride onto the cam surface so as to be projected upwardly.

22. An apparatus of the character described comprising a table, a means operable to raise and lower a stencil over a portion of the table, a squeegee mounted to press upon the stencil, a means to reciprocate the squeegee on the stencil while the stencil is lowered, a means to rock the squeegee, a means operable to withdraw a piece of paper from beneath the stencil while the stencil is raised, and a means cooperating with the squeegee when said squeegee is rocked to one position to feed paint in front of the squeegee.

23. An apparatus of the character described comprising a table, a means operable to raise and lower a stencil over a portion of the table, a means operable to feed a piece of paper to position beneath the stencil while the stencil is raised, a squeegee mounted to press upon the stencil, a means to reciprocate the squeegee over the stencil when said stencil is lowered, and a means to feed paint in front of the squeegee in measured quantities.

Signed at Los Angeles, California this 28 day of February, 1928.

ROGER TULL.
ROLAND J. SMITH.